United States Patent
Berger et al.

(10) Patent No.: US 9,686,166 B2
(45) Date of Patent: *Jun. 20, 2017

(54) POWER FLUCTUATION DETECTION AND ANALYSIS

(71) Applicant: Time Warner Cable Enterprises LLC, New York, NY (US)

(72) Inventors: Will Berger, Fairfax, VA (US); Mark Wynkoop, Vernon, NY (US); Mark Wyman, Ashburn, VA (US); Noel Dempsey, Brewerton, NY (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 161 days.

This patent is subject to a terminal disclaimer.

(21) Appl. No.: 14/831,786

(22) Filed: Aug. 20, 2015

(65) Prior Publication Data
US 2015/0358222 A1  Dec. 10, 2015

Related U.S. Application Data

(63) Continuation of application No. 13/468,564, filed on May 10, 2012, now Pat. No. 9,143,379.
(Continued)

(51) Int. Cl.
*G06F 15/173* (2006.01)
*H04L 12/26* (2006.01)
(Continued)

(52) U.S. Cl.
CPC .............. *H04L 43/08* (2013.01); *H04L 29/00* (2013.01); *H04L 41/06* (2013.01); *H04L 69/40* (2013.01); *H04N 7/00* (2013.01); *H04N 17/00* (2013.01)

(58) Field of Classification Search
None
See application file for complete search history.

(56) References Cited

U.S. PATENT DOCUMENTS

| 2005/0183130 | A1* | 8/2005 | Sadja | H04N 7/17309 |
| | | | | 725/107 |
| 2009/0086804 | A1* | 4/2009 | Miller | H03G 3/3078 |
| | | | | 375/228 |
| 2011/0119517 | A1* | 5/2011 | Beeco | H04L 41/0677 |
| | | | | 713/340 |

* cited by examiner

*Primary Examiner* — Padma Mundur
(74) *Attorney, Agent, or Firm* — Michael P. Straub; Stephen T. Straub; Ronald P. Straub

(57) ABSTRACT

The network monitoring system collects transmission and/or receive power level information from a plurality of customer premise devices connected to the same distribution node for each of a plurality of network distribution nodes. For an individual network distribution node, the network monitoring system calculates a set of fluctuation parameters including a group power level deviation metric, e.g., a modified standard deviation ratio. The network monitoring system evaluates the generated fluctuation parameters and responds, e.g., outputting a fluctuations report, modifying a data collection profile being used by a set of customer premise devices corresponding to a distribution node, commanding diagnostics to be performed on a portion of the network and/or directing a service technician. The network monitoring system compares generated fluctuation parameters corresponding to different distribution nodes, and uses the results of the comparison to assign priority with regard to the assignment of limited available troubleshooting and repair resources.

18 Claims, 12 Drawing Sheets

| NODE | # OF FLUCTUATING ACCOUNTS | # OF FLUCTUATING DEVICES | FLUCTUATING LEVEL | MODIFIED STANDARD DEVIATION RATIO | NUMBER OF CRITICAL VIOLATIONS (12DB) | NUMBER OF WARNING VIOLATIONS (6DB) | % OF ACCOUNTS THAT ARE FLUCTUATING | % OF DEVICES THAT ARE FLUCTUATING |
|---|---|---|---|---|---|---|---|---|
| Node MS031 | 48 | 58 | FDC: 3% RDC: 97% | 6.34 | 9 | 59 | 85.71 | 78.38 |
| Node PT081 | 27 | 31 | FDC: 9% RDC: 91% | 5.42 | 30 | 44 | 46.55 | 41.89 |
| Node IR069 | 15 | 16 | RDC: 100% | 5.37 | 0 | 16 | 88.24 | 80 |
| Node IT151 | 31 | 31 | FDC: 3% RDC: 97% | 4.47 | 0 | 32 | 68.89 | 60.78 |
| Node OS027 | 59 | 69 | FDC: 4% RDC: 96% | 4.3 | 1 | 72 | 71.95 | 58.47 |
| Node GE014 | 43 | 51 | FDC: 7% RDC: 93% | 3.96 | 3 | 53 | 63.24 | 50 |
| Node DV041 | 46 | 81 | FDC: 96% RDC: 4% | 3.51 | 0 | 82 | 36.22 | 37.16 |

Related U.S. Application Data

(60) Provisional application No. 61/641,295, filed on May 1, 2012.

(51) Int. Cl.
*H04L 29/00* (2006.01)
*H04L 12/24* (2006.01)
*H04L 29/14* (2006.01)
H04N 7/00 (2011.01)
H04N 17/00 (2006.01)

| FIGURE 2A |
| FIGURE 2B |
| FIGURE 2C |

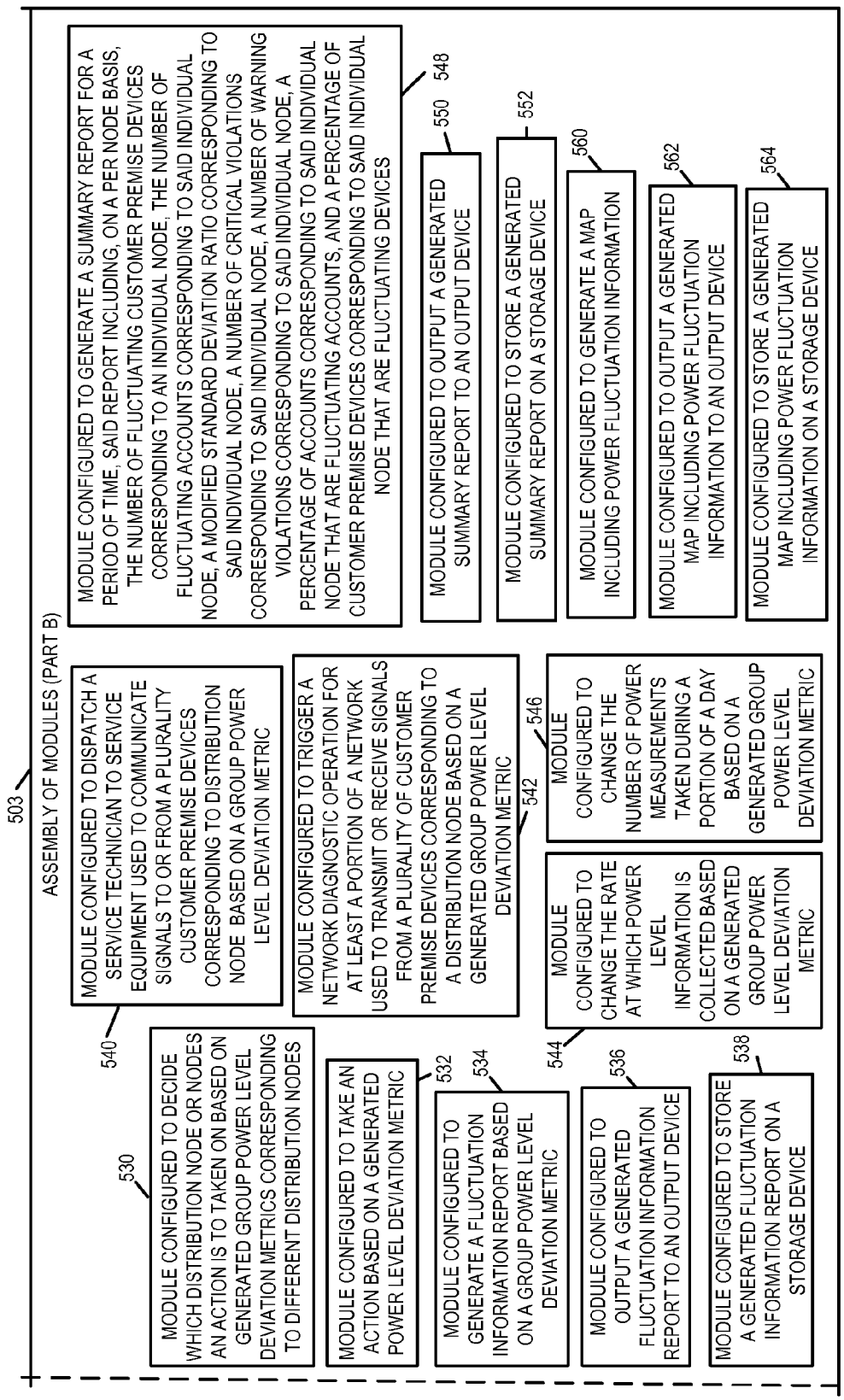

POWER FLUCTUATION DETECTION AND ANALYSIS

RELATED APPLICATIONS

The present application is a continuation of pending U.S. patent application Ser. No. 13/468,564 filed on May 10, 2012 which claims the benefit of U.S. Provisional Patent Application Ser. No. 61/641,295, titled "POWER FLUCTUATION DETECTION AND ANALYSIS" filed May 1, 2012 each of which is hereby expressly incorporated by reference in its entirety.

FIELD OF INVENTION

Various embodiments are directed to monitoring communications systems, e.g., cable network communications systems, and, more specifically, to detecting, analyzing and/or utilizing signal fluctuations to detect network faults and/or allocating resources for preventing network outages prior to the occurrence of a fault which may result in a network service outage.

BACKGROUND

Some existing systems identify a hard type failure on an individual customer premise device, e.g., a cable modem, based on an individual poll and use of simple threshold, e.g., a comparison to a pass/fail power level threshold. Such an approach is well suited for detecting a failure in a transmitter and/or receiver of an individual device located at a customer premise. While detection of failures of devices such as cable modems located at individual customer premises can be useful in addressing the service needs of individual customers who are suffering from a faulty customer premise device various other types of network faults may affect multiple customers at the same time. The failure of an individual cable modem provides little information with regard to the probability that other cable modems, potentially installed at different times, are likely to fail.

Distribution nodes and/or communications links which are used in a network to supply content to multiple customer premise devices are potential network failure points which can affect a large number of customer premises at the same time, e.g., a local or regional failure affecting many customer premises may result when a distribution node or communications link fails.

The existing systems of detecting faults in an individual customer premise device, e.g., cable modem, are not well suited to identify exiting or potential network level problems which may affect multiple customer premise locations in a geographic area.

In view of the above discussion it should be appreciated that there is a need for methods and/or apparatus for identifying existing network communications problems and/or identifying potential network level problems which may affect multiple customer premise locations at the same time preferably prior to an actual network outage. Such methods and/or apparatus can be useful in targeting diagnostic resources and/or maintenance personnel to a node or area where problems with network equipment and/or communications links have the potential to affect multiple customer premise locations at the same time prior to or in response to a communications, e.g., content delivery, problem.

SUMMARY

Customer premise devices, e.g., cable modems or digital phones, collect receive and/or transmit power level information, e.g., Forward Data Carrier (FDC) level values and/or Return Data Carrier (RDC) level values. In some embodiments, the data is collected repetitively as part of regularly scheduled Simple Network Management Protocol (SNMP) polls. In some embodiments, the network monitoring system directly queries each piece of equipment in accordance with a schedule for specific metrics. The schedule can, and in some embodiments is, controlled from a central location, e.g., from a network monitoring system that collects the power level information. The network monitoring system may be implemented as a single node, e.g., a server, which controls the collection and/or processing of collected power fluctuation information.

The network monitoring system collects transmission power level information and/or receive power level information from a plurality of customer premise devices connected to the same distribution node for each of a plurality of network distribution nodes. For an individual network distribution node, the network monitoring system calculates a set of fluctuation parameters. In at least some embodiments the set of fluctuation parameters include a group power level deviation metric, e.g., a modified standard deviation ratio, and various other group parameters, e.g., a number of fluctuating accounts, a number of fluctuating devices, a number of critical violations, a number of warning violations, a percentage of accounts that are fluctuating and a percentage of devices that are fluctuating. The network monitoring system evaluates the generated fluctuation parameters and responds, e.g., generating, outputting and/or storing fluctuations reports, modifying a data collection profile being used by a set of customer premise devices corresponding to a distribution node, commanding diagnostics to be performed on a portion of the network and/or directing a service technician. The network monitoring system compares generated fluctuation parameters corresponding to different distribution nodes, and uses the results of the comparison to assign priority with regard to the assignment of limited available troubleshooting and repair resources. The network monitoring system may, and in some embodiments does, automatically alter when power level measurements are conducted and/or request additional measurements in response to detected power level fluctuations at a distribution node thereby facilitating identification of the problem and/or problems causing the fluctuations.

By considering power fluctuating information corresponding to multiple customer premise devices, e.g., cable modems, in a region, distribution problems, e.g., particular problem distribution nodes and/or communications links which are shared by the cable modems suffering transmit and/or receive power fluctuations can be identified. Thus, actual or potential problems can be identified and/or isolated within a large network. In some embodiments in response to detecting potential problems, increased monitoring and/or monitoring at different times is automatically implemented to help identify and isolate the source of reported transmission and/or receive power fluctuations. Such power fluctuations may be caused, e.g., by temperature fluctuations at a node or shared communications link due to normal heating and/or environmental changes during the day. The increase in monitoring, e.g., collection of more reports throughout the day, can and sometimes is used to identify temperature related faults and distinguish them from other non-temperature related faults, e.g., hardware faults which are not temperature dependent. For example, large power fluctuations during the hottest part of the day with minimal fluctuations during the night may be indicative of a temperature related fault. Detected fluctuations from multiple customer premise device can, and in some embodiments are, used to automatically trigger the automatic dispatching of service personnel to a node or region where large transmit or receive power fluctuations are reported by multiple customer premise devices, e.g., cable modems. In this manner a problem may be identified and corrected before an actual service outage occurs in the region and without the need of a human system administrator to perform the dispatching or trigger the dispatching of a service person or personnel.

In some embodiments power fluctuation reports are generated on a per distribution node basis with transmit and receive power fluctuation information being displayed separately and/or in conjunction with a combined fluctuation indicator metric. The display of separate transmit and receive power fluctuation metrics generated from information provided by multiple customer premises facilitates easy detection of whether a problem relates to the transmit hardware, receive hardware or hardware or communications links affecting both the transmission to and reception from multiple customer premise devices corresponding to different customer premise locations which have a distribution node or communications link in common.

Power fluctuation information can, and in some embodiments is, overlaid on a map including distribution nodes and communications link information to facilitate identification of potential points of failure which might result in the detected transmit and/or receive power fluctuation pattern.

As should be appreciated by collecting transmit and receive power fluctuation information and using it to control automatic additional network testing, faults can be identified and/or predicted in many cases prior to actual service outages. In addition, the automatic aggregation and distribution of power fluctuation information in the form of network wide reports and visual maps including power fluctuation information can simplify the identification of actual network problems by service personal to whom the reports are displayed.

In some embodiments various alert levels may be set with different regions generating alerts and/or report metrics based on different power fluctuation trigger levels. For example, in regions which are subject to large temperature fluctuations, alerts and/or what are considered critical power fluctuations may be generated in response to power fluctuations which are larger than used in regions with more constant temperatures throughout the day.

Different alert fluctuation thresholds' may but need not be used for different parts of the day.

In view of the above, it should be appreciated that the methods and apparatus of the invention are advantageous in that they facilitate identification of areas of a network suffering from high transmit and/or receive power level fluctuation, e.g., in comparison to other areas of the network or what would normally be expected. The methods and apparatus, at least in some embodiments take into consideration different weightings with regard to signal fluctuation when analyzing the system for problems and allocating troubleshooting resources. The weightings may be regional and/or time dependent to take into consideration environmental, loading or other regional/time of day issues which might result in normal transmission and/or receive power level fluctuations.

An exemplary method of monitoring a communications system, in accordance with some embodiments, comprises: collecting at least one of transmission power level information or received power level information from a first plurality of customer premise devices; generating a first group power level deviation metric from collected power level information received from said first plurality of customer premise devices; and taking an action based on the generated first group power level deviation metric.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
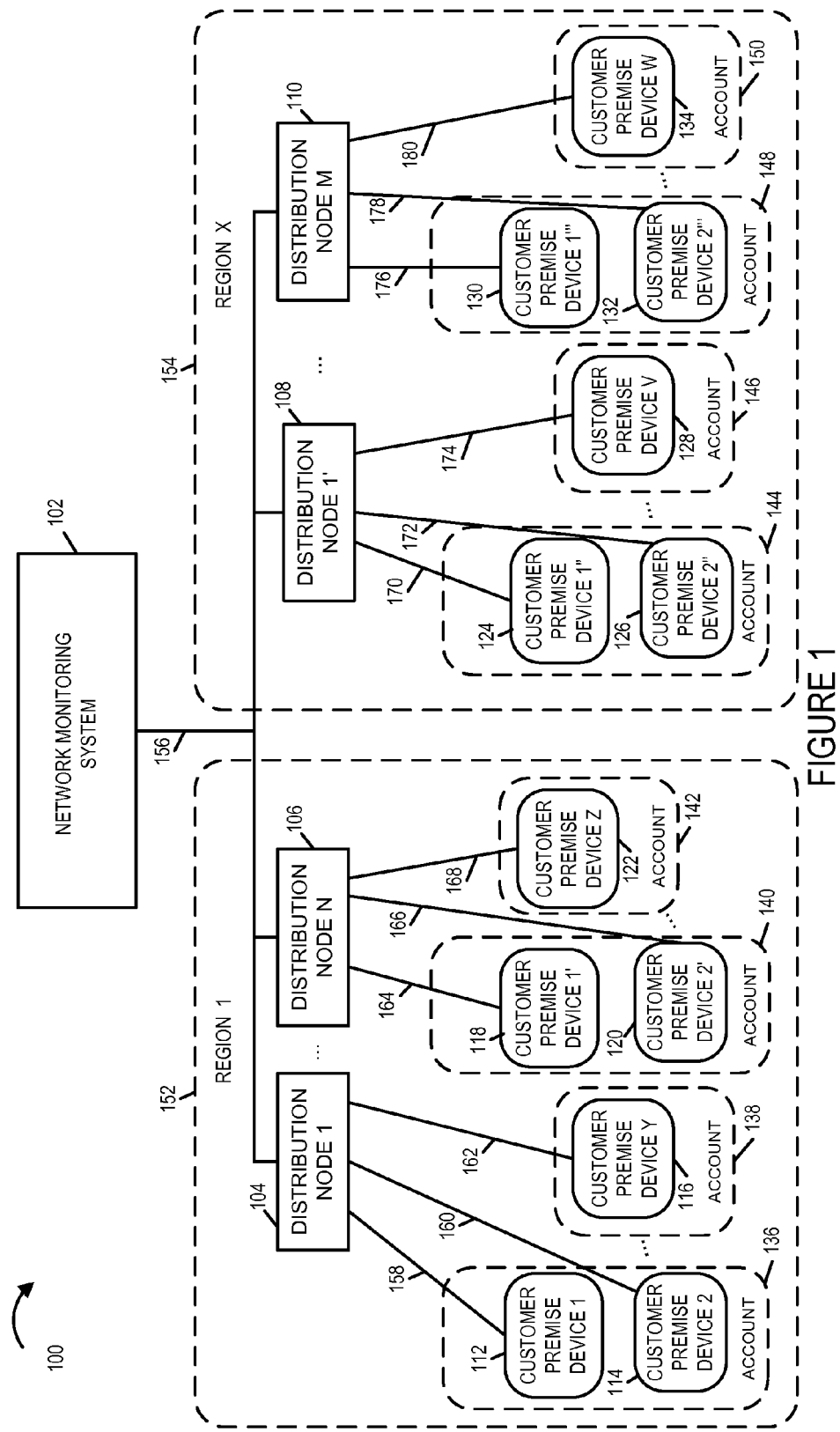
FIG. 1 is a drawing of an exemplary communications system, e.g., a cable network communications system, including fluctuation detection and analysis in accordance with an exemplary embodiment.

FIG. 1 is a drawing of an exemplary communications system 100, e.g., a cable network communications system, including fluctuation detection and analysis in accordance with an exemplary embodiment. Exemplary communications system 100 includes a network monitoring system 102, a plurality of distribution nodes, and a plurality of customer premise devices. In exemplary system 100 there are a plurality of regions (region 1 152, . . . , region X 154.) In region 1 152, there are a plurality of distribution nodes (distribution node 1 104, . . . , distribution node N 106). In region 1 152, there are a plurality of customer premise devices (customer premise device 1 112, customer premise device 2 114, . . . , customer premise device Y 116) connected to distribution node 1 104 via links (158, 160, . . . , 162), respectively. In region 1 152, there are a plurality of customer premise devices (customer premise device 1' 118, customer premise device 2' 120, . . . , customer premise device Z 122) connected to distribution node N 106 via links (164, 166, . . . , 168), respectively. In region X 154, there are a plurality of distribution nodes (distribution node 1' 108, . . . , distribution node M 110). In region X 154, there are a plurality of customer premise devices (customer premise device 1" 124, customer premise device 2" 126, . . . , customer premise device V 128) connected to distribution node 1' 108 via links (170, 172, . . . , 174), respectively. In region X 154, there are a plurality of customer premise devices (customer premise device 1''' 130, customer premise device 2''' 132, . . . , customer premise device W 134) connected to distribution node M 110 via links (176, 178, . . . , 180), respectively. The various distribution nodes (104, 106, 108, 110) are coupled to network monitoring system 102 via link 156.

One of more customer premise devices are grouped to the same account. For example, a single account may correspond to one or more customer premise devices at the same location, e.g., the same house or apartment. In this example, customer premise device 1 112 and customer premise device 2 114 correspond to account 136; customer premise device Y corresponds to account 138; customer premise device 1' 118 and customer premise device 2' 120 correspond to account 140; and customer premise device Z 122 corresponds to account 142. In this example, customer premise device 1" 124 and customer premise device 2" 126 correspond to account 144; customer premise device V 128 corresponds to account 146; customer premise device 1''' 130 and customer premise device 2''' 132 correspond to account 148; and customer premise device W 134 corresponds to account 150.

An individual customer premise device performs measurements, e.g., forward data carrier (FDC) and return data carrier (RDC) level measurements, with regard to signals being received from/transmitted to the distribution node to which it is connected. In various embodiments, one or more different types of measurements are performed in accordance with a schedule, e.g., a predetermined schedule, and/or in response to a command to perform additional diagnostic measurements. Measurement data collected by a customer premise device, corresponding to a plurality of measurement times, is reported to the network monitoring system. The network monitoring system identifies which customer premise devices are connected to which distribution nodes, and aggregates collected information from the customer premise devices connected to the same distribution node. The network monitoring system generates, for each distribution node, a set of data used the evaluate fluctuations. Exemplary generated data used to evaluate fluctuations includes: the number of fluctuating accounts, the number of fluctuating devices, the fluctuating level, a number of critical violations, a number of warning violations, a percentage of accounts that are fluctuating, a percentage of devices that are fluctuating an a group power level deviation metric, e.g., a modified standard deviation ratio. The network monitoring system identifies a network distribution node exhibiting high fluctuations and takes an action in response, e.g., commanding diagnostic measurements by the customer premise devices of identified network distribution node, changing the rate of scheduled testing at the customer premise devices of the identified distribution node and/or dispatching a service technician to the identified network distribution node.

Figures 2, 2A:
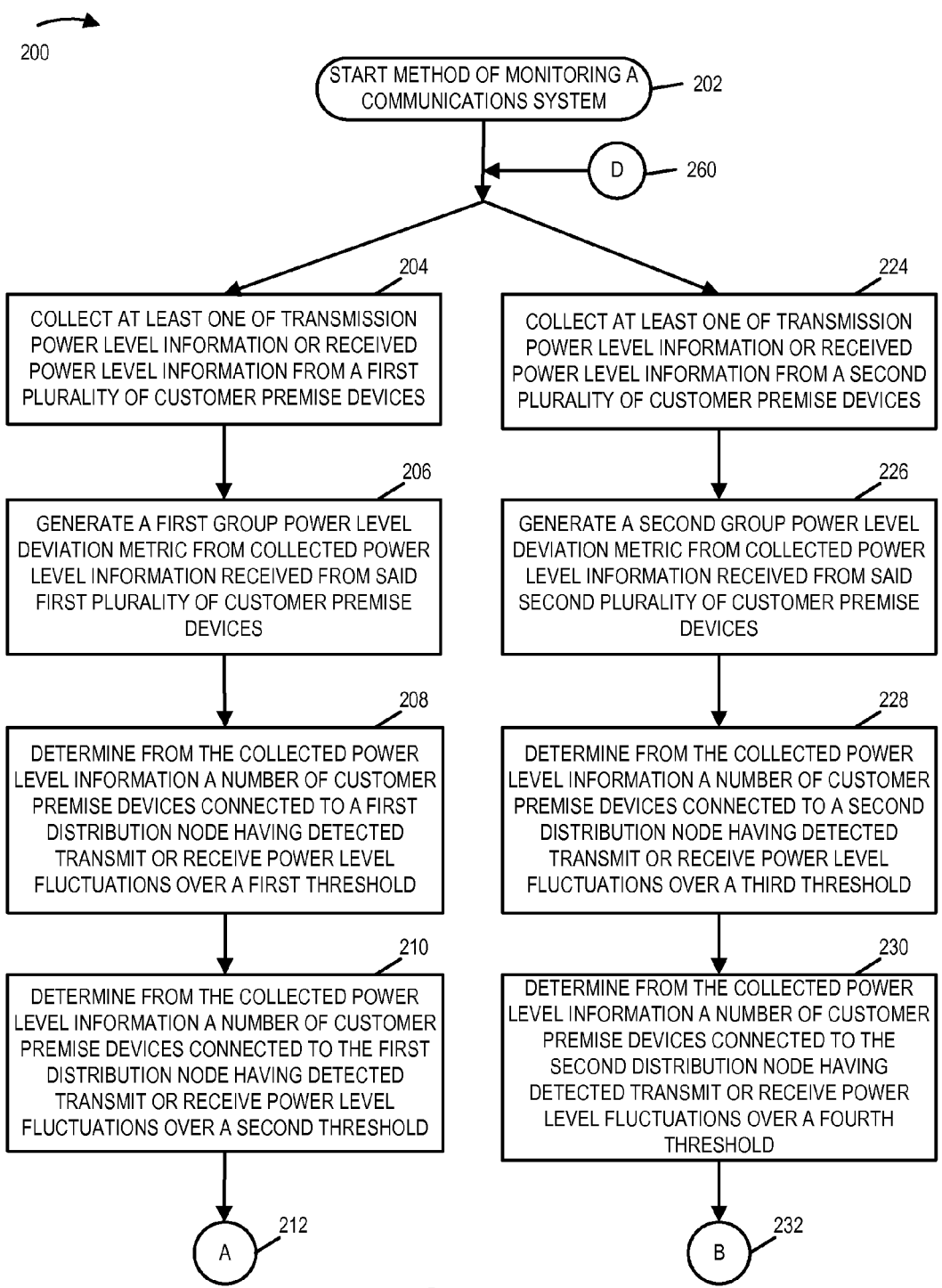
FIG. 2, comprising the combination of FIG. 2A, FIG. 2B and FIG. 2C, is a flowchart of an exemplary method of monitoring a communications system in accordance with an exemplary embodiment.
Figure 2B:
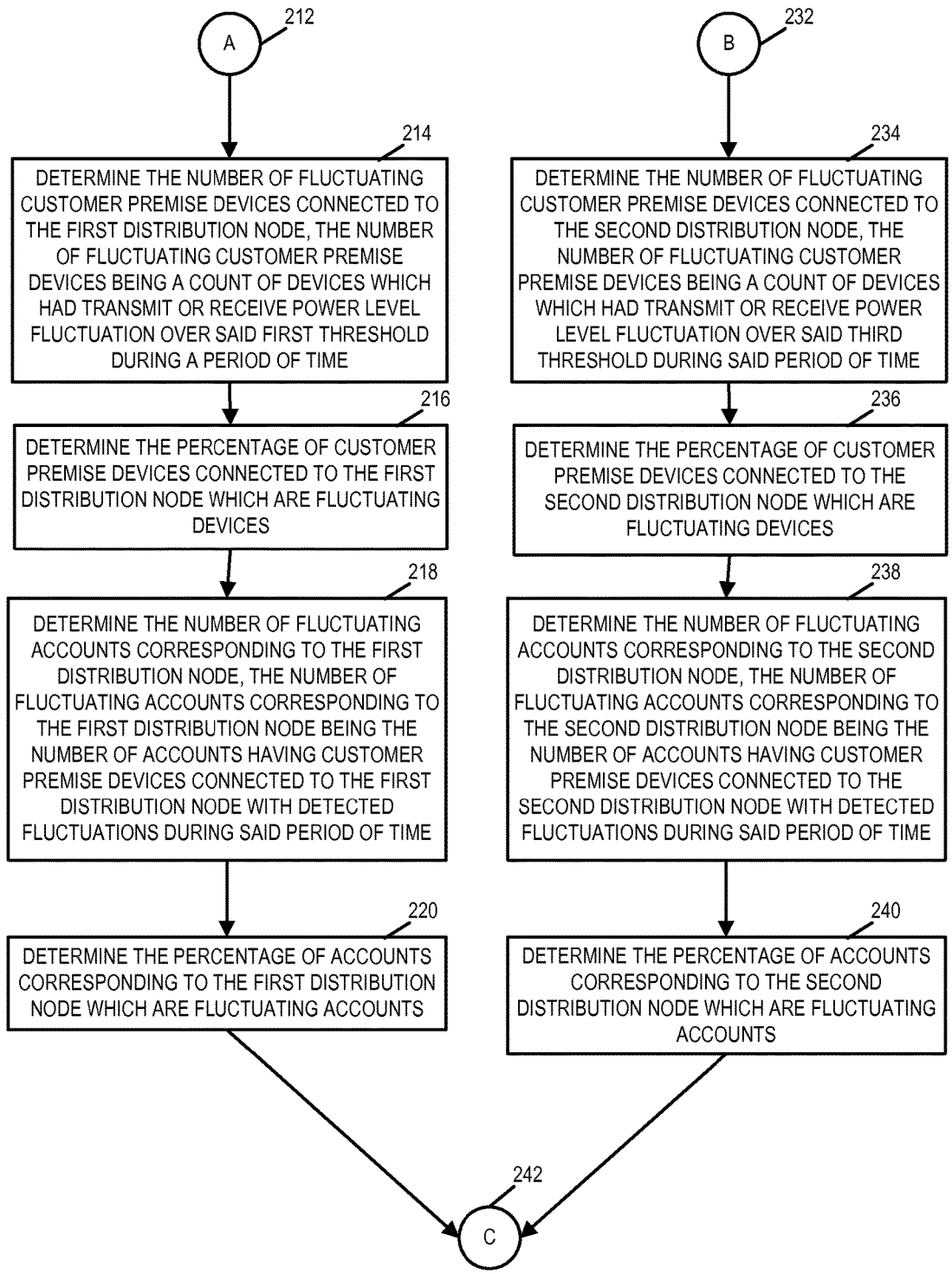
Figure 2C:
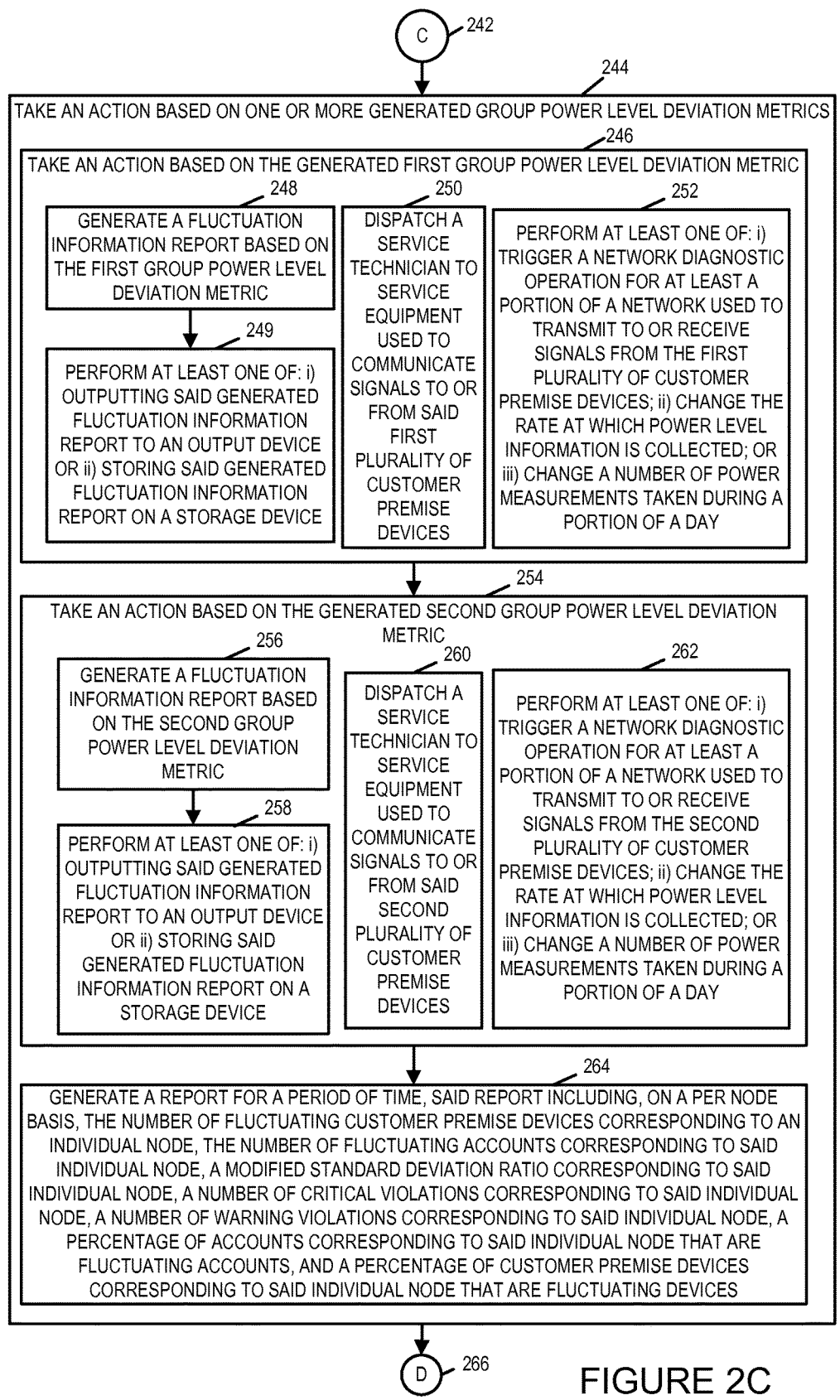

FIG. 2, comprising the combination of FIG. 2A, FIG. 2B and FIG. 2C, is a flowchart 200 of an exemplary method of monitoring a communications system, e.g., a cable network communications system, in accordance with an exemplary embodiment. Operation starts in step 202 where the communications system is powered on and initialized. Operation proceeds from start step 202 to steps 204 and 224. In step 204 a network monitoring system collects at least one of transmission power level information or received power level information from a first plurality of customer premise devices. The first plurality of customer premise devices are connected to a first distribution node. Operation proceeds from step 204 to step 206. In step 206 the network monitoring system generates a first group power level deviation metric, e.g., a modified standard deviation ratio, from collected power level information received from said first plurality of customer premise devices. Then, in step 208 the network monitoring system determines from the collected power level information a number of customer premise devices connected to the first distribution node having detected transmit or receive power level fluctuations over a first threshold, e.g., a warning violation threshold. Operation proceeds from step 208 to step 210, in which the network monitoring system determines from the collected power level information a number of customer premise devices connected to the first distribution node having transmit or receive power level fluctuations over a second threshold, e.g., a critical violation threshold. Operation proceeds from step 210, via connecting node A 212 to step 214.

In step 214 the network monitoring system determines the number of fluctuating customer premises devices connected to the first distribution node, the number of fluctuating customer premise devices being a count of devices which had transmit or receive power level fluctuations over said first threshold during a period of time. Operation proceeds from step 214 to step 216. In step 216 the network monitoring system determines the percentage of customer premise devices connected to the first distribution node which are fluctuating devices. Operation proceeds from step 216 to step 218. In step 218 the network monitoring system determines the number of fluctuating accounts corresponding to the first distribution node, the number of fluctuating accounts corresponding to the first distribution node being the number of account shaving customer premise devices connected to the first distribution node with detected fluctuations during said period of time. Operation proceeds from step 218 to step 220. In step 220 the network monitoring system determines the percentage of accounts connected to the first distribution node which are fluctuating accounts.

Returning to step 224, in step 224, the network monitoring system collects at least one of transmission power level information or received power level information from a second plurality of customer premise devices. The second plurality of customer premise devices are connected to a second distribution node. Operation proceeds from step 224 to step 226. In step 226 the network monitoring system generates second group power level deviation metric, e.g., a modified standard deviation ratio, from collected power level information received from said second plurality of customer premise devices. Then, in step 228 the network monitoring system determines from the collected power level information from the second plurality of customer premise devices a number of customer premise devices connected to the second distribution node having detected transmit or receive power level fluctuation over a third threshold, e.g., a warning violation threshold. Operation proceeds from step 228 to step 230. In step 230 the network monitoring system determines from the collected power level information from the second plurality of customer premise devices a number of customer premise devices connected to the second distribution node having detected transmit or receive power level fluctuations over a fourth threshold, e.g., a critical violation threshold. Operation proceeds from step 230, via connecting node B 232, to step 234.

In step 234, the network monitoring system determines the number of fluctuating customer premise devices connected to the second distribution node, the number of fluctuating customer premise devices being a count of customer premise devices connected to the second distribution node which had transmit or received power level fluctuation over said third threshold during said period of time. Operation proceeds from step 234 to step 236. In step 236, the network monitoring system determines the percentage of customer premise devices connected to the second distribution node which are fluctuating devices. Operation proceeds from step 236 to step 238. In step 238 the network monitoring system determines the number of fluctuating accounts corresponding to the second distribution node, the number of fluctuating accounts corresponding to the second distribution node being the number of accounts having customer premise devices connected to the second distribution node with detected fluctuations during said period of time. Operation proceeds from step 238 to step 240. In step 240 the network monitoring system determines the percentage of accounts connected to the second distribution node which are fluctuating accounts.

Operation proceeds from steps 220 and 240 via connecting node C 242 to step 244. In step 244 the network monitoring system takes an action based on one or more generated group power level deviation metrics. Step 244 includes steps 246, 254 and 264.

In step 246, the network monitoring system takes an action based on the generated first group power level deviation metric. Step 246 includes steps 248, 249, 250 and 252. One or more of all of steps 248, 249, 250, and 252 are performed. In step 248 the network monitoring system generates a fluctuation information report based on the first group power level deviation metric. Then, in step 249, the network monitoring system performs at least one of: i) outputting said generated fluctuation information report, of step 248, to an output device or ii) storing said generated fluctuation information report, of step 248, on a storage device.

In step 250 the network monitoring system dispatches a service technician to service equipment used to communicate signal to or from the first plurality of customer premise devices.

In step 252, the network monitoring system performs at least one of: i) triggering a network diagnostic operation for, at least a portion of a network used to transmit to or receive signals from the first plurality of customer premise devices; ii) change the rate at which power level information is collected; or iii) change the number of power level measurements taken during a portion of a day. In some embodiments, changing the rate at which transmission power level information is collected includes changing the rate to perform more measurements per day. In some embodiments, changing the number of power measurements taken during a portion of a day includes increasing the measurements and/or shortening the period between measurements during the period of the day when fluctuations are high, e.g., above a warning or critical threshold.

In step 254, the network monitoring system takes an action based on the generated second group power level deviation metric. Step 254 includes steps 256, 258, 260 and 262. One or more of all of steps 256, 258, 260 and 262 are performed. In step 256 the network monitoring system generates a fluctuation information report based on the second group power level deviation metric. Then, in step 258, the network monitoring system performs at least one of: i) outputting said generated fluctuation information report, of step 256, to an output device or ii) storing said generated fluctuation information report, of step 256, on a storage device.

In step 260 the network monitoring system dispatches a service technician to service equipment used to communicate signal to or from the second plurality of customer premise devices.

In step 262, the network monitoring system performs at least one of: i) triggering a network diagnostic operation for, at least a portion of a network used to transmit to or receive signals from the second plurality of customer premise devices; ii) change the rate at which power level information is collected with regard to the second plurality of communications devices; or iii) change the number of power level measurements taken during a portion of a day with regard to the second plurality of communications devices.

Operation proceeds from step 254 to step 264. In step 264 the network monitoring system generates a report for a period of time, said report including, on a per node basis, the number of fluctuating customer premise devices corresponding to an individual node, the number of fluctuating accounts corresponding to said individual node, a modified standard deviation ratio corresponding to said individual node, a number of critical violations corresponding to said individual node, a number of warning violations corresponding to said individual node, a percentage of accounts corresponding to said individual node that are fluctuating accounts, and a percentage of fluctuating accounts corresponding to said individual node that are fluctuating devices.

Operation proceeds from step 244, via connecting node D 266, to steps 204 and 224. Flowchart 200 of FIG. 2 illustrates exemplary monitoring and actions corresponding to two exemplary distribution nodes. In various embodiments, the various steps which correspond to the first or second distribution node may be performed for other distribution nodes in the system in addition to the first and second distribution node. In some embodiments, actions in response to a power level deviation metric and/or fluctuation reporting is performed corresponding to the particular distribution nodes in the system which have detected a potential problem but not for the other distribution nodes in the system which have not detected a problem. In some embodiments, during different iterations of the flowchart 200, a different distribution node in the system is the first distribution node and a different distribution node is the second distribution node.

In some embodiments, a customer premise device is, e.g., a cable modem or a digital phone. In some embodiments, a distribution node is a Hybrid Fiber-Coaxial (HFC) node. In some embodiments, in which the first distribution node and the second distribution node are located in the same region, the first threshold is the same as the third threshold and the second threshold is the same as the fourth threshold.

In some embodiments, in which the first distribution node and the second distribution node are located in the different regions, the first threshold is different from the third threshold and the second threshold is different from the fourth threshold. In some such embodiments, the first distribution node and the second distribution node are subjected to different environmental conditions, e.g., different temperatures and/or temperature variations.

In some embodiments, in which the first distribution node and the second distribution nodes correspond to different manufacturers, the first threshold is different from the third threshold and the second threshold is different from the fourth threshold. In some embodiments, in which the first distribution node and the second distribution nodes correspond to different versions of the same manufacturer, the first threshold is different from the third threshold and the second threshold is different from the fourth threshold.

In some embodiments, a decision to take an action, e.g., in step 244, is based upon at least one group power level deviation metric, e.g., a modified standard deviation ratio, and at least one other value from the set of: number of fluctuating accounts, number of fluctuating devices, FDC fluctuating level, RDC fluctuating level, number of critical violations, number of warning violations, percentage of accounts that are fluctuating, and percentage of devices that are fluctuating, corresponding to the same distribution node. In some embodiments, a decision to take an action, e.g., in step 244, is based upon at least one group power level deviation metric, e.g., a modified standard deviation ratio, and at least two values from the set of: number of fluctuating accounts, number of fluctuating devices, FDC fluctuating level, RDC fluctuating level, number of critical violations, number of warning violations, percentage of accounts that are fluctuating, and percentage of devices that are fluctuating, corresponding to the same distribution node. In some embodiments, a decision to take an action, e.g., in step 244, is based upon at least one group power level deviation metric, e.g., a modified standard deviation ratio, and at least three values from the set of: number of fluctuating accounts, number of fluctuating devices, FDC fluctuating level, RDC fluctuating level, number of critical violations, number of warning violations, percentage of accounts that are fluctuating, and percentage of devices that are fluctuating, corresponding to the same distribution node.

In some embodiments, the network monitoring system decides whether to automatically assign a service technician to the first distribution node or the second distribution node based on a comparison of the first group power level deviation metric and the second group power level deviation metric, e.g., the technician is assigned to the distribution node having the higher value for its modified standard deviation ratio. In some embodiments, the network monitoring system decides whether to automatically assign a service technician to the first distribution node or the second distribution node based on a comparison of the first group power level deviation metric and the second group power level deviation metric, and based on a comparison of a least one value from the set of: {number of fluctuating accounts, number of fluctuating devices, FDC fluctuating level, RDC fluctuating level, number of critical violations, number of warning violations, percentage of accounts that are fluctuating, and percentage of devices that are fluctuating} corresponding to the first distribution node with the same type of at least one value from the set of: {number of fluctuating accounts, number of fluctuating devices, FDC fluctuating level, RDC fluctuating level, number of critical violations, number of warning violations, percentage of accounts that are fluctuating, and percentage of devices that are fluctuating} corresponding to the second distribution node.

Figure 3:
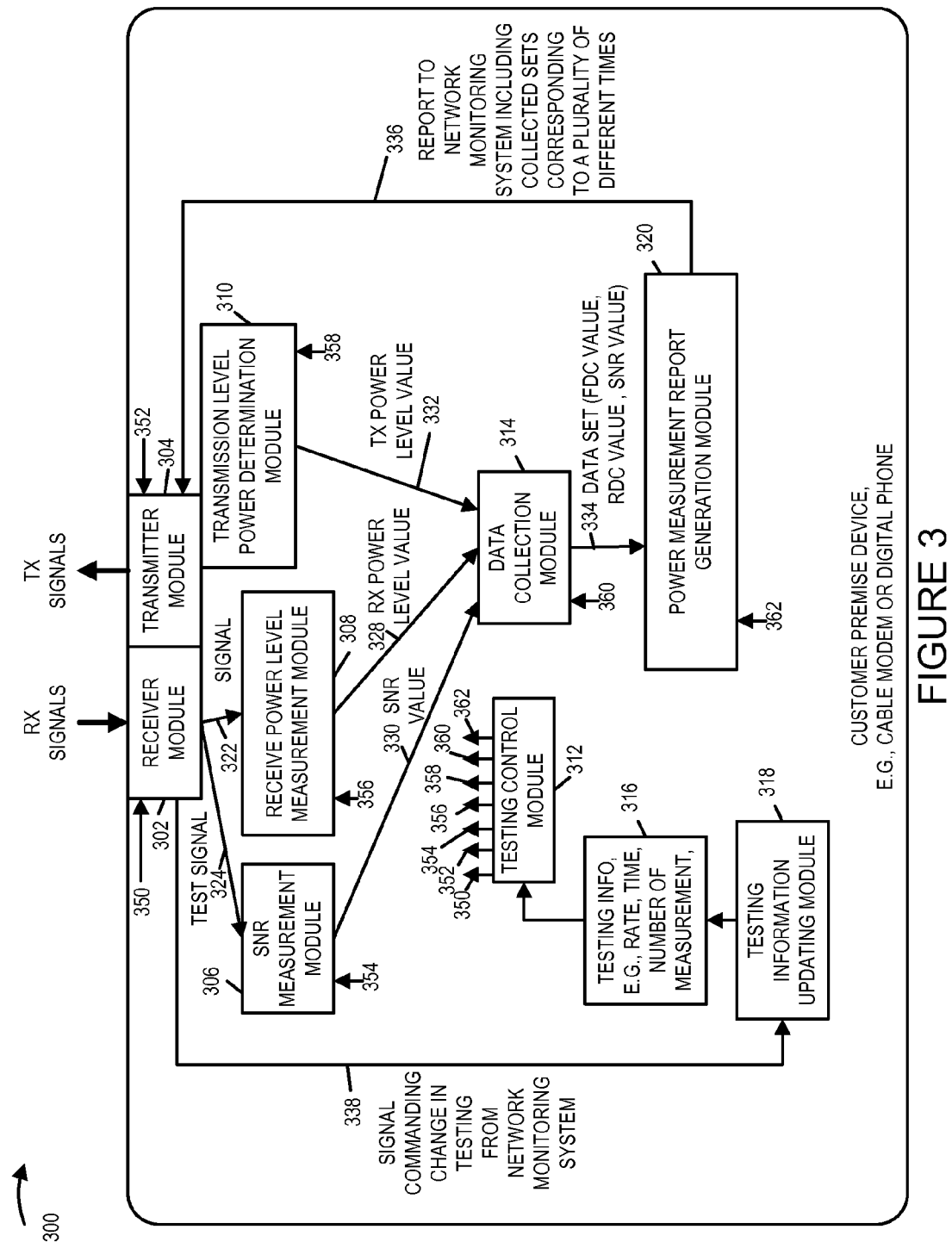
FIG. 3 is a drawing of an exemplary customer premise device in accordance with an exemplary embodiment.

FIG. 3 is a drawing of an exemplary customer premise device 300, e.g., a cable modem or digital phone, in accordance with an exemplary embodiment. Customer premise device is, e.g., and of the customer premise devices of system 100 of FIG. 1. Customer premise device 300 includes a receiver module 302, a transmitter module 304, an SNR measurement module 306, a receive power level measurement module 308, a transmission power determination module 310, a testing control module 312, a data collection module 314, testing information 316, a testing information updating module 318, and a power measurement report generation module 320.

Testing information 316 includes, e.g., testing rate information, testing time information, information identifying which particular measurements are to be performed, information identifying the number of measurements to be performed, testing schedule information. The testing information 316 is used by the testing control module 312 to generate controls signals (350, 352, 354, 356, 358, 360, 362) to control the operation of the various modules (302, 304, 306, 308, 310, 314, 320), respectively. While in advanced customer premise devices the testing control module may control the implementation of multiple tests according to a schedule, in many embodiments the testing control module responds to instructions and/or requests that specific tests be performed with the test results then being sent to the transmitter module for reporting to the network monitoring system, e.g., server. In embodiments where the customer premise device simply responds to SNMP requests, the network monitoring system can control the scheduling, times, and/or rate of such tests by sending out SNMP requests for transmit, receive and/or SNR level information in accordance with the desired schedule, times and/or rate at which such information is to be collected from a device. Thus, in such embodiments the network monitoring system controls the polling of the customer premise devices avoiding the customer premise devices having to collect and aggregate power measurements over an extended time period, e.g., hours or days according to a schedule stored in or supplied to the customer premise device. As should be appreciated, whether the aggregation and storage of multiple power level measurements occurs in the customer premise device and are reported up to the network monitoring system in a single message or test results corresponding to each individual time period are sent separately may depend on the particular embodiment and/or the capabilities of the customer premise devices.

The polling rate and/or tests performed by the individual customer premise devices is controlled by the network monitoring system and can be changed in response to detection of power fluctuation levels exceeding one or more thresholds and/or as part of automatically triggered diagnostic process with the customer premise device responding to poll requests with the requested transmit, receive and/or SNR level information.

Transmission power level determination module 310 determines the transmission power level of signals transmitted by transmitter module 304. Signal 332, generated by transmission power determination module 310 conveys the determined TX power level value to data collection module 314. Receive power level measurement module 308 measures the received power of received signal 322 received by receiver module 302. Signal 328, generated by receive module 310 conveys the determined RX power level value to data collection module 314.

SNR measurement module 306 determines an SNR level based on received signals 324 which includes received test signaling 324. Signal 330, generated by SNR measurement module 306 conveys the determined SNR value to data collection module 314.

Data collection module 314 collects the data and forms a data set, e.g., including a FDC value, a RDC value, and an SNR value. Data collection module 314 sends the data set 334 to power measurements report generation module 320. The data collection process is performed a number of times under the control of the testing control module based on the testing information 316.

Power report generation module 320 generates a report 336 directed to the network monitoring system including collected sets corresponding to a plurality of different times. The power report generation module 320 also adds time tag information corresponding to the data sets and information identifying the reason that the testing was performed for each set of data in the report. Drawing 700 illustrates exemplary data communicated in report 336. Report 336 is transmitted by transmitter module 336 and routed to the network monitoring system, e.g., network monitoring system 102 of system 100 of FIG. 1.

Customer premise device 300 may, and sometimes does, receive a signal 338 from the network monitoring system commanding a change in the testing. Testing information updating module 318 receives, via receiver module 302, command signal 338 and updates the testing information 316 in response to the received command signal 338. Testing control module 312 implements the change in testing. Various exemplary commands include a diagnostic test operation, a change in the rate at which power level information is collected, and a change in the number of power measurements taken during a portion of a day.

Figure 4:
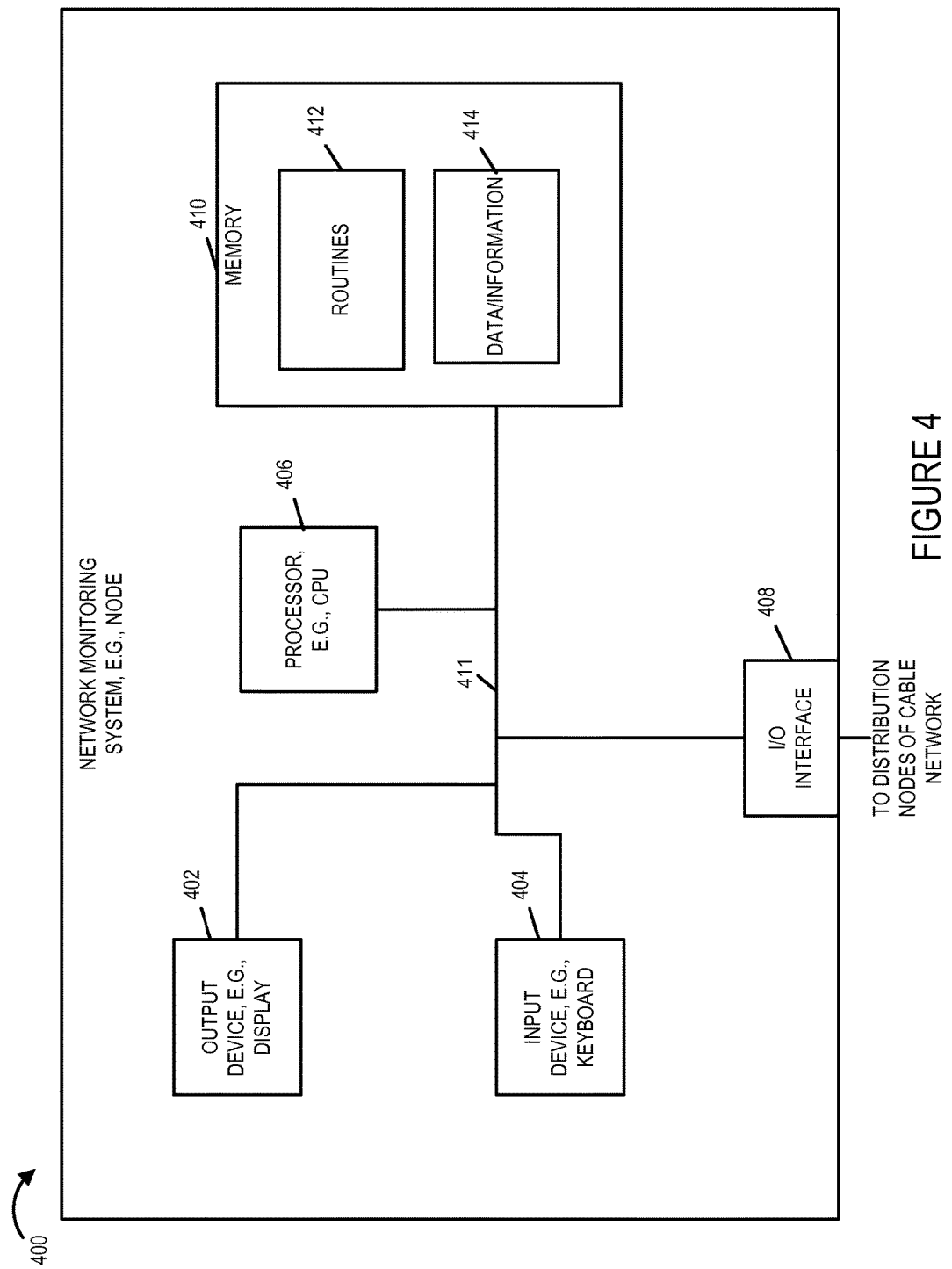
FIG. 4 is drawing of an exemplary network monitoring system in accordance with an exemplary embodiment.

FIG. 4 is drawing of an exemplary network monitoring system 400, e.g., a network monitoring node, in accordance with an exemplary embodiment. Network monitoring system 400 is, e.g., network monitoring system 102 of communications system 100 of FIG. 1. Network monitoring system 400 includes an output device 402, e.g., a display, an input device 404, e.g., a keyboard, a processor 406, e.g., a CPU, an I/O interface 408, and memory 410. The various elements (402, 404, 406, 408, 410) are coupled together via a bus 411 over which the various elements may exchange data and information. Memory 410 includes routines 412 and data/information 414. The processor 406 executes the routines 412 and uses the data/information 414 in memory 410 to control the network monitoring system and implement steps of a method, e.g., the method of flowchart 200 of FIG. 2.

Figure 5A:
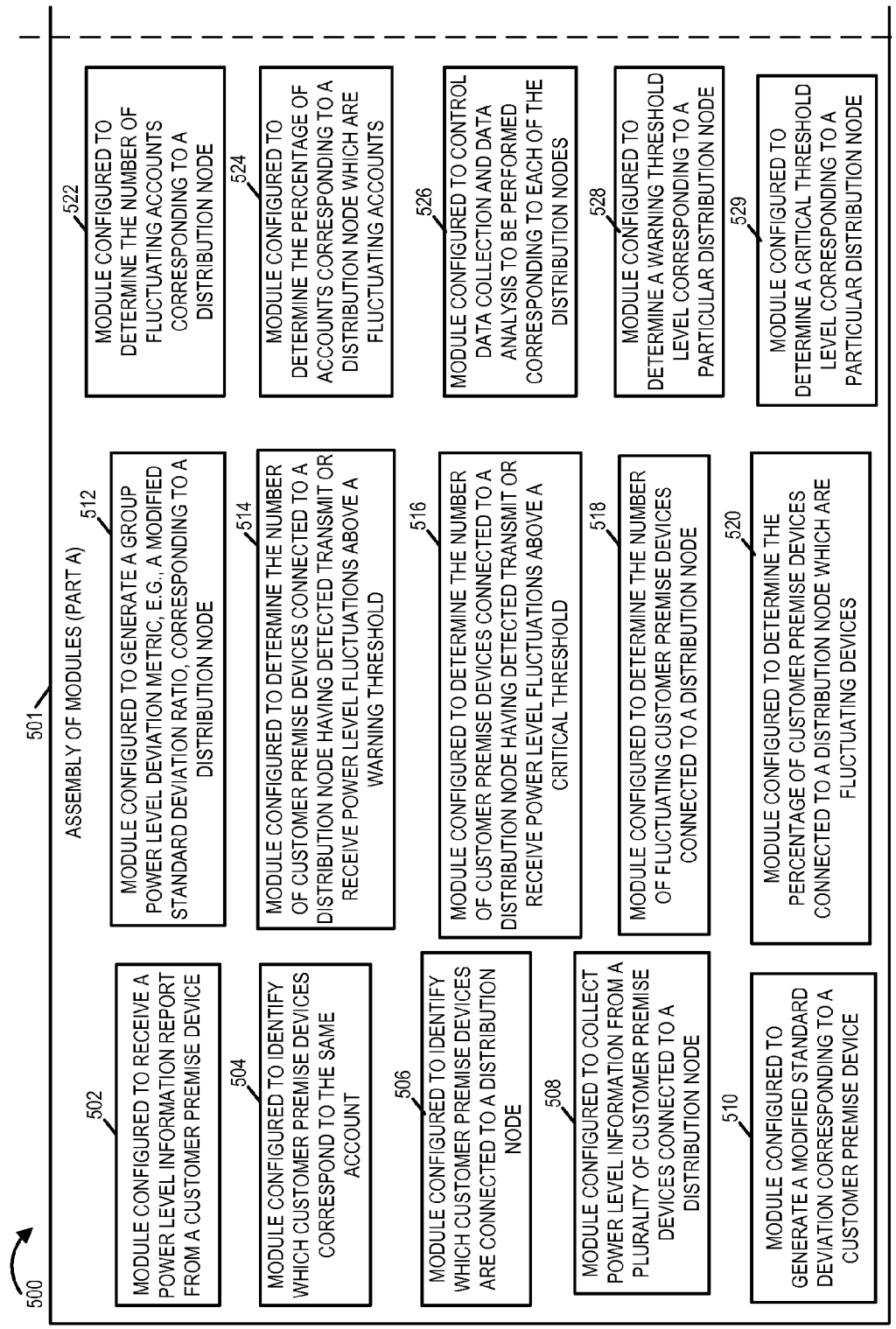
FIG. 5, comprising the combination of FIG. 5A and FIG. 5B, is an exemplary assembly of modules that may be included in the routines of the memory of exemplary network monitoring system of FIG. 4.

FIG. 5, comprising the combination of FIG. 5A and FIG. 5B, is an assembly of modules 500, comprising the combination of part A 501 and part B 503. The assembly of modules 500 is, e.g., included in routines 412 of memory 410 of network monitoring system 400 of FIG. 4.

Assembly of modules 500 includes a module 502 configured to receive a power level information report from a customer premise device, a module 504 configured to identify which customer premise devices correspond to the same account, a module 506 configured to identify which customer premise devices are connected to a distribution node, a module 508, e.g., a collection module, configured to collect power level information form a plurality of customer premise devices connected to a distribution node, a module 510 configured to generate a modified standard deviation corresponding to a customer premise device. Assembly of modules 500 further includes a module 512, e.g., a first group power level deviation metric generation module, configured to generate a group power level deviation metric, e.g., a modified standard deviation ratio, corresponding to a distribution node, a module 514, e.g., a first customer premise device determination module, configured to determine the number of customer premise devices connected to a distribution node having detected transmit or receive power level fluctuations above a warning threshold, a module 516, e.g., a second customer premise number determination module, configured to determine the number of customer premise devices connected to a distribution node having detected transmit or receive power level fluctuations above a critical threshold, a module 518, e.g., a third customer premise number determination module, configured to determine the number of fluctuating customer premise devices connected to a distribution node, a module 520 configured to determine the percentage of customer premise devices connected to a distribution node which are fluctuating devices, a module 522 configured to determine the number of fluctuating accounts corresponding to a distribution node, a module 524 configured to determine the percentage of accounts corresponding to a distribution node which are fluctuating accounts, and a module 526 configured to control data collection and data analysis to be performed corresponding to each of the distribution nodes. Assembly of modules 500 further includes a module 528 configured to determine a warning threshold level corresponding to a particular distribution node and a module 529 configured to determine a critical threshold level corresponding to a particular distribution node.

Assembly of modules 500 further includes a module 530 configured to decide which distribution node or nodes an action is to be taken on based on generated group power level deviation metrics corresponding to different distribution nodes, a module 532 configured to take an action based on a generated power level deviation metric, a module 534, e.g., a report generation module, configured to generate a fluctuation information report based on a group level power deviation metric, a module 536, e.g., an output module, configured to output a generated fluctuation information report to an output device, and a module 538, e.g., a report storage module, configured to store a generated fluctuation information report on a storage device. Assembly of modules 500 further includes a module 540, e.g., an automatic service dispatch module, configured to dispatch a service technician to service equipment used to communicate signals to or from a plurality of customer premise devices corresponding to a particular distribution node based on a group level power deviation metric. Assembly of modules 500 further includes a module 542 configured to trigger a network diagnostic operation for at least a portion of a network used to transmit or receive signals from a plurality of customer premise devices corresponding to a distribution node based on a generated group power level deviation metric, a module 544 configured to change the rate at which power level information is collected based on a generated group power level deviation metric, and a module 546 configured to change the number of power measurements taken during a portion of a day based on a generated group power level deviation metric.

Assembly of modules 500 further includes a module 548 configured to generate a summary fluctuation information report for a period of time, said report including, on a per distribution node basis, the number of fluctuation customer premise devices corresponding to an individual node, the number of fluctuating accounts corresponding to said individual node, a modified standard deviation ratio corresponding to said individual node, a number of critical violations corresponding to said individual node, a number of warning violations corresponding to said individual node, a percentage of accounts corresponding to said individual node which are fluctuating accounts and a percentage of customer premise devices corresponding to said individual node which are fluctuating devices. Assembly of modules 500 further includes a module 550 configured to output a generated summary report to an output device and a module 552 configured to store a generated summary report to a storage device.

Assembly of modules 500 further includes a module 560 configured to generate a map including power fluctuation information, a module 562 configured to output a generated map included power fluctuation information to an output device, e.g., a display, and a module 564 configured to output a generated map including power fluctuation information to a storage device. The generated map is, e.g., a map including distribution nodes and communications links with the power fluctuation information overlaid on the map to facilitate the identification of potential points of failure. The power fluctuation information may be indicated using text, symbols, highlighting, and/or different coloring. In some embodiments, distribution nodes experiencing critical fluctuations may be identified in red and distribution nodes experiencing warning fluctuations may be identified in yellow.

In various embodiments, module 530 uses input from additional group level fluctuation parameters when deciding which node or nodes an action is to be taken on. For example, in addition to basing its decision on a modified standard deviation ratio, module 530 uses input from one or more or all: the number of fluctuating devices, the number of fluctuating accounts, the percentage of fluctuating devices, the percentage of fluctuating accounts, fluctuating level information for RDC, fluctuating level information for FDC, number of critical violations, and number of warning violations.

In one embodiment, module 508 performs steps 204 and 224 of flowchart 200; module 512 performs steps 206 and 226 of flowchart 200; module 514 performs steps 208 and 228 of flowchart 200; module 516 performs steps 210 and 230 of flowchart 200; module 518 performs steps 214 and 234 of flowchart 200; module 520 performs steps 216 and 236 of flowchart 200; module 520 performs steps 522 performs steps 218 and 236 of flowchart 200; module 524 performs steps 220 and 240 of flowchart 200; module 532 performs steps 224, 246 and 254 of flowchart 200; module 534 performs steps 248 and 256 of flowchart 200; module 536 performs a portion of step 249 and 258 of flowchart 200; module 538 performs a portion of step 249 and 258 of flowchart 200; module 540 performs step 250 and 260 of flowchart 200; module 542 performs a portion of step 252 and 262 of flowchart 200; module 544 performs a portion of step 252 and 262 of flowchart 200; module 544 performs step 250 and 260 of flowchart 200; module 546 performs a portion of step 252 and 262 of flowchart 200; and module 548 performs step 264 of flowchart 200.

Module 508, e.g., a collection module is configured to collect at least one of transmission power level information or received power level information from a first plurality of customer premise devices. Module 512, e.g., a first group power level deviation metric generation module, is configured to generate a first group power level deviation metric from collected power level information received from said first plurality of customer premise devices. One or more of modules 532, 534, 536, 538 or 540, e.g., action modules, are configured to take an action based on the generated first group power level deviation metric. Module 534, e.g., a report generation module, is configured to generate a fluctuation information report based on said first group power level deviation metric. Module 536, e.g., an output module, is configured to output said generated fluctuation information report to an output device. Module 538, e.g., a report storage module, is configured to store said generated fluctuation information report on a storage device. Module 540, e.g., an automatic service dispatch module, is configured to automatically dispatch a service technician to service equipment used to communicate signals to or from said first plurality of customer premise devices.

In some embodiments, taking an action includes at least one of: i) triggering a network diagnostic operation for at least a portion of a network used to transmit to or receive signals from the first plurality of customer premise devices; ii) changing the rate, e.g., more measurements per day, at which power level information is collected; or iii) changing a number of power measurements taken during a portion of a day, e.g., increase the number of measurements/shorten the period between measurements during a period of a day in which fluctuations are high, e.g., above a warning or critical threshold.

In some embodiments, the first plurality of customer premise devices are connected to a first distribution node, and module 514, e.g., a first customer premise device determination module, is configured to determine from the collected power level information a number of customer premise devices connected to the first distribution node having detected transmit or receive power level fluctuations over a first threshold, e.g., a warning violation threshold. In some embodiments, the first plurality of customer premise devices are connected to a first distribution node, and module 516, e.g., a second customer premise number determination module, is configured to determine from the collected power level information a number of customer premise devices connected to the first distribution node having a detected transmit or receive power level fluctuations over a second threshold, e.g., a critical violation threshold. In some embodiments, the first plurality of customer premise devices are connected to a first distribution node, and module 518, e.g., a third customer premise number determination module, is configured to determine from the collected power level information a number of fluctuating customer premise devices connected to the first distribution node, the number of fluctuating devices being a count of the number of devices which had transmit or receive power level fluctuation over said threshold during a period of time.

Figure 6:
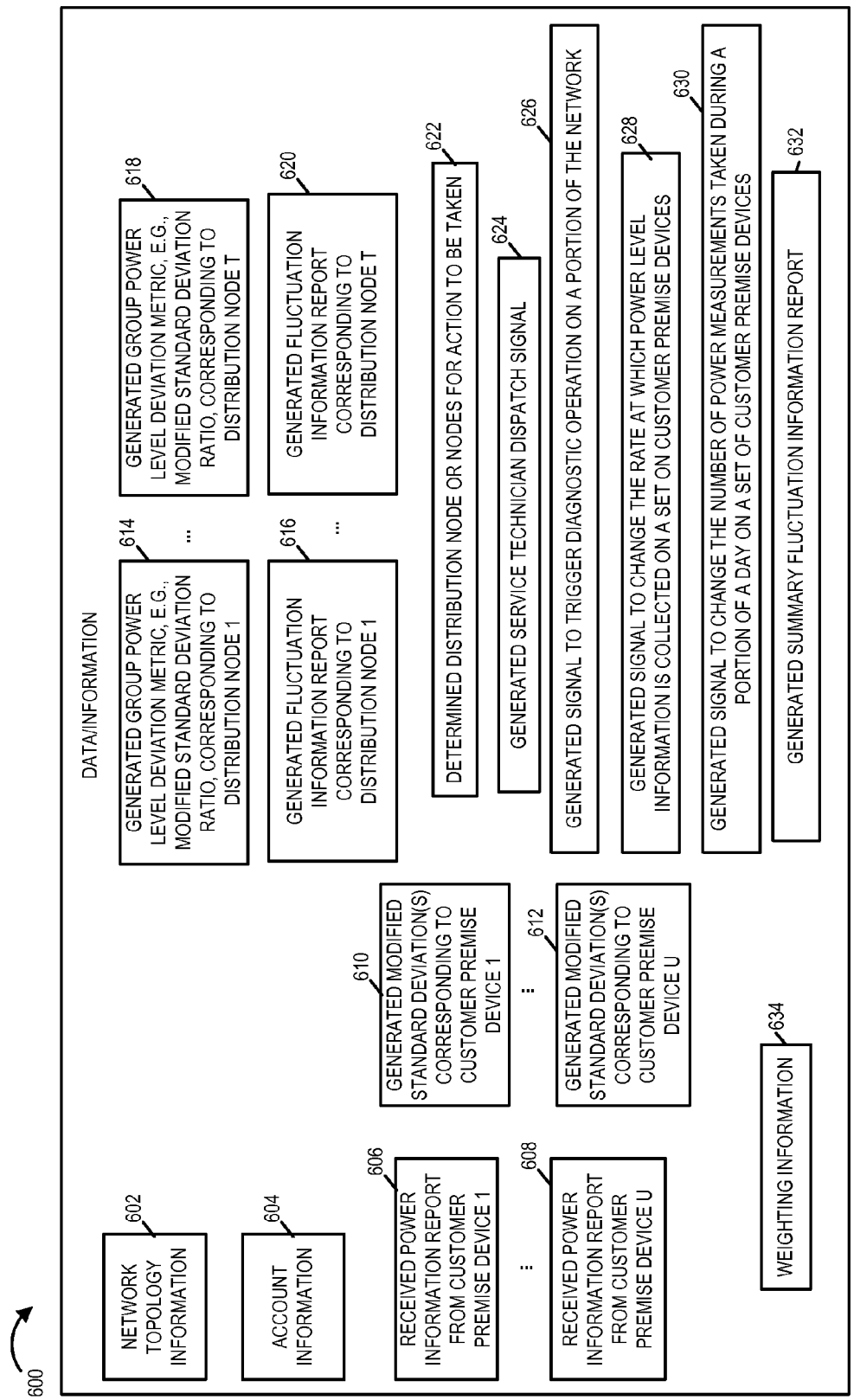
FIG. 6 illustrates exemplary data/information which may be included in the memory of the exemplary network monitoring system of FIG. 4.

FIG. 6 is a drawing of data/information 600 in accordance with an exemplary embodiment. Data/information 600 is, e.g., included in data/information 414 of network monitoring system 400 of FIG. 4. Data/information 600 includes network topology information 602, e.g., information identifying which customer devices are connected to which network distribution nodes and information indicating which devices and nodes are located in which regions of the system. Data/information 600 also includes account information 604, e.g., information associating a set of one or more customer premise devices with a customer account, e.g., a customer account corresponding to a particular location. Data/information 600 includes a plurality of received power information reports from a plurality of customer premise devices (received power information report from customer premise device 1 606, . . . , received power information report from customer premise device U 608). Data/information also includes generated modified standard deviation(s) corresponding to each of the received reports from the customer premise devices (generated modified standard deviation(s) corresponding to customer premise device 1 610, . . . , generated modified standard deviation(s) corresponding to customer premise device U 612). One exemplary received power information report from a customer premise device is, e.g., a set of 12 pairs of data measurements of an FDC level and an RDC level with corresponding time tag information indicating when the measurements were performed. In one embodiments, the measurements correspond to 3 days with 4 pairs of measurements per day with the measurement pairs being approximately evenly spaced in time, e.g., a pair of measurements being taken by the customer premise device once every eight hours.

Data/information 600 also includes a generated group power level deviation metric, e.g., a modified standard deviation ratio, corresponding to each distribution node (generated group power level deviation metric, e.g., modified standard deviation ratio, corresponding to distribution node 1 614, . . . , generated group power level deviation metric, e.g., modified standard deviation ratio, corresponding to distribution node T 618). Data/information 600 also includes a fluctuation information report corresponding to each distribution node (generated fluctuation information report corresponding to distribution node 1 616, . . . , generated fluctuation information report corresponding to distribution node T 620.)

Data/information 600 further includes information 622 identifying the determined distribution node or nodes for which action is to be taken based on the generated group power level deviation metrics. Data/information 600 further includes a generated service technician dispatch signal 624 to direct the technician to a suspected problem area, a generated signal to trigger diagnostic operation on a portion of the network 626, a generated signal to change the rate at which power level information is collected on a set of customer premise devices corresponding to an identified distribution node 628, a generated signal to change the number of power level measurements taken during a portion of a day in a set of customer premise devices corresponding to an identified distribution node 630 and a generated summary fluctuation report 632.

Network topology information 602 is used by module 506 and module 542. Account information 604 is used by module 504. Received reports (606, . . . , 608) are received by module 502. Generated modified standard deviation(s) (610, . . . , 612) are generated by module 510 from information included in received reports (606, . . . , 608), respectively, using weighting information 634. Generated group power level deviation metrics (614, . . . , 618) are generated by module 512. Generated fluctuation information reports (616, . . . , 620 are generated by module 534. Information 622 is determined by module 530. Dispatch signal 624 is generated and output by module 540. Diagnostic signal 626 is generated and output by module 542. Change signal 628 is generated and output by module 544. Change signal 630 is generated and output by module 630. Generated summary fluctuation information report 632 is generated by module 548, output by module 550 and stored by module 552.

Various aspects and/or features of some embodiments of the invention will be further discussed below. The concept behind the fluctuation report is to implement an advanced telemetry analysis routine that analyzes variation within a given metric over a sequential number of data points, and then aggregates those fluctuations up to a common analysis point. That aggregation point is then analyzed across a number of metrics to determine a relative degree of instability to aid in the dispatch and efficiency of problem resolution.

This logic could apply to any metric that was received over a sequence of data points to detect unacceptable levels of inconsistency. In particular Telecommunications and multiple system operator (MSO) services could benefit from this technology.

Various embodiments of the invention address the problem of a lack of functionality in current metric analysis and signal level diagnosis systems. Some current metric analysis systems only check a parameter against a simple threshold, and do not diagnose instability over time. Various embodiments, of the current invention are directed to diagnosing instability over time.

Various embodiments of the current invention measure a significant number of polls over a longer period and use a calculation to determine the impact and degree of the instability over a set of sets. In some embodiments data corresponding to many devices over many metrics is collected, analyzed and used in making decisions.

The concept behind the fluctuation report is to implement an advanced telemetry analysis routine that analyzes variation within a given metric over a sequential number of data points, and then aggregates those fluctuations up to a common analysis point. That aggregation point is then analyzed across a number of metrics to determine a relative degree of instability to aid in the dispatch and efficiency of problem resolution. A basic example of this process is outlined below.

Take a given cable modem as a starting point. This cable modem has two metrics important to its success. Those metrics are "Transmit" and "Receive". Each metric can be, and in some embodiments, is measured as a snapshot of its current performance through a Simple Network Management Protocol (SNMP) poll.

In this example, the Transmit and Receive of the Cable Modem is polled 12 times over the course of 3 days, or 4 times a day. In some embodiments, the data is collected by the modem and communicated to the network monitoring system, e.g., in a report including the measurements and corresponding time tag information. The data collection results in a set of data points like the data set shown below. In some embodiments, time tag information corresponding to measurements is implicit and is not necessarily communicated directly in the report to the network monitoring system. The data shown below represents a sequence of poll results from earliest to latest.

Transmit: 30, 50, 30, 50, 30, 50, 30, 50, 30, 50, 30, 50
Receive: 8, 2, 8, 2, 8, 2, 8, 2, 8, 2, 8, 2

These polls represent the same time frame for both metrics. To generate a individual ranking of instability, take the standard deviation of these sets of polls.
This results in:
  Std Dev Transmit: 10.44
  Std Dev Receive: 3.13
where both are rounded to the second decimal. The standard deviation calculations can be performed by the modem and reported to the network monitoring system or calculated directly by the network monitoring system.

At this point a measure of instability for the purposes of one Cable Modem has been obtained. However, in order to determine a larger area's instability, it is advantageous to aggregate and compare the overall number of devices and their individual level fluctuations, e.g., to identify plant impairments such as a problem at a particular distribution node connected to a specific set of customer premise devices. In order to identify problems in the network, such as a particular area of instability in the network, a network monitoring system performs the following calculations once the standard deviations have been calculated per Cable Modem Per Metric:

For each of the metrics per modem in a given area, in this case a Hybrid Fiber-Coaxial (HFC) node, the network monitoring system creates a sum total of each of the standard deviations. Consider that each modem in this area had the same pattern of fluctuations as the example modem above, and that there were 100 modems in this area. Since the Standard Deviation of the modem above results in 13.57, then the calculated sum total for the area is 1375. Then take the sum total of 1375 and express it as a ratio to the total number of devices in the area, in this example, 100. This results in an area standard deviation of 13.57.

As an addition to this calculation, the system as implemented allows for weighting of individual metrics and degrees of fluctuation. So if the business organization identifies that the Receive metric is inherently more critical and requires more stability, the individual modem standard deviation calculation can be, and in some embodiments, is modified by a weight some percentage. In some embodiments, the network monitoring system implements the identified weighting.

In addition, the system as implemented allows for weighting for degree of fluctuation beyond a set threshold. So if the metric of Receive was defined as having allowable upper levels of 7 or below and lower levels of 3 or greater, the weighting system could, and in some embodiments, does add an additional fluctuation penalty for any data point outside that range. So in the above example a level that was 1 point above the upper threshold could be increased by a multiplier to indicate additional severity. That would result in the below transformation:

Original Receive: 8, 2, 8, 2, 8, 2, 8, 2, 8, 2, 8, 2
Original Receive Standard Deviation: 3.13
Multiplier of 2× per point beyond threshold.
Thresholds set as >=3 and <=7
Implemented Multipliers: +2, −2, +2, −2, +2, −2, +2, −2, +2, −2, +2, −2
Transformed Receive: 10, 0, 10, 0, 10, 0, 10, 0, 10, 0, 10, 0
New Modified Standard Deviation for Receive for this Modem: 5.22

This new measurement is referred to as "Modified Standard Deviation". In some embodiments, a modified standard deviation for receive for a customer premise device is calculated and a modified standard deviation for transmit is calculated for the same customer premise device. In some embodiments, a single modified standard deviation for the customer premise device, e.g., modem, is calculated, e.g., the average of the modified standard deviation for receive and the modified standard deviation for transmit.

The aggregate value used for area analysis is referred to as the "Modified Standard Deviation Ratio". The network monitoring system calculates a modified standard deviation ratio for a network distribution node. For example, if there are a plurality of customer premise devices connected to the same distribution node, in one embodiment, the modified standard deviation ratio for the distribution node is calculated from averaging the modified standard deviation ratios from each of the plurality of customer premise devices connected to the distribution node. In some embodiments, separate modified standard deviation ratios are determined for a distribution mode for receive and for transmit. In some embodiments, a single modified standard deviation ratio is determined for a network distribution node. In some embodiments, in determining a single modified standard deviation ratio for a distribution node equal weighting is given to transmit and receive. In some embodiments, in determining a single modified standard deviation ratio for a distribution node different weightings are given to transmit and receive.

This modified standard deviation ratio metric is used by the network monitoring system to compare areas of service, e.g., in a Cable Plant or region or within the network, based upon both degree of fluctuation and breadth of fluctuation.

The network monitoring system directs resources at those areas expected to have the largest degree of impact over the largest collection of subscribers based on the calculated modified standard deviation ratios. In some embodiments, the modified standard deviation ratio for a distribution node, is a sum of each of the modified standard deviations for each of the metrics, e.g., modified standard deviation for receive and modified standard deviation for transmit, from each of the customer premise devices connected to the distribution node, divided by the total number of customer premise devices connected to the distribution node.

Figure 7:
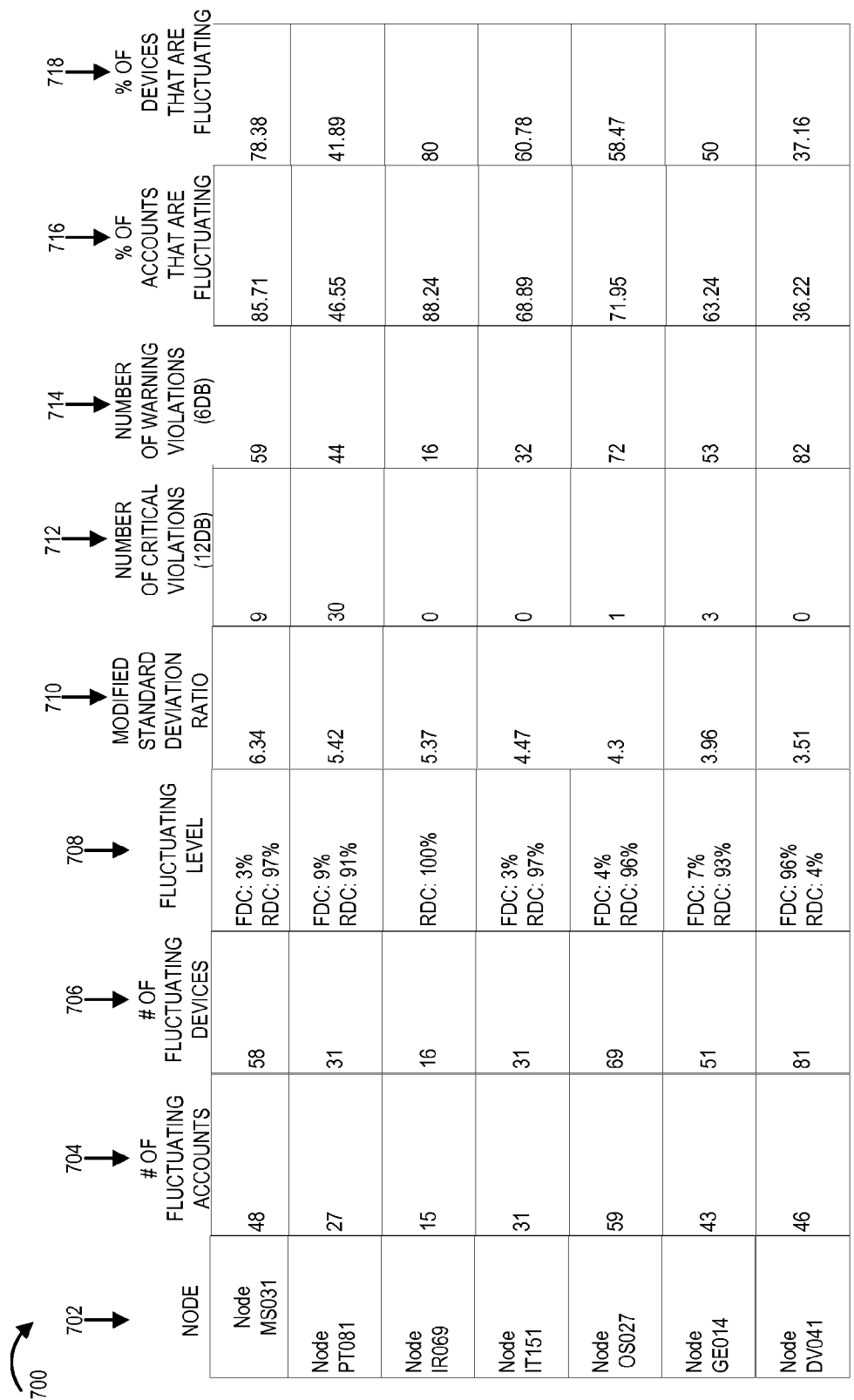
FIG. 7 illustrates an exemplary display corresponding to fluctuation detection and analysis reporting for a plurality of exemplary distribution nodes in an exemplary communications system.

An example of this display mechanism is provided in drawing 700 of FIG. 7. First column 702 identifies a plurality of nodes, e.g., distribution nodes, being monitored. Second column 704 includes the number of fluctuating accounts corresponding to each node. In some embodiments, the number of fluctuating accounts represent the number of accounts corresponding to the node that showed fluctuation over two subsequent test measurements, e.g., two subsequent polls, wherein the fluctuation was high enough to trigger a warning violation or critical violation. Third column 706 includes the number of fluctuating devices corresponding to each node, e.g., distribution node. In some embodiments, the number of fluctuating devices represent the number of customer premise devices corresponding to the node that showed fluctuation over two subsequent test measurements, e.g., two subsequent polls, wherein the fluctuation was high enough to trigger a warning violation or critical violation. Fourth column 708 includes the fluctuating levels for two signal levels, the FDC (receive) and RDC (transmit), with regard to the customer premise devices corresponding to each node. Fluctuating level represents a percentage of the detected device fluctuations, which include detected warning and critical fluctuations, observed during a data window. For example if 68 fluctuations, which comprise 9 critical violations and 59 warning violations, occurred corresponding to the node during the window, with 2 fluctuations occurring on receive and 66 fluctuations occurring on transmit, the field would represent FDC: 3% RDC 97%, as shown in the first row of column 708. In general, one signal level will usually account for the vast majority of fluctuations.

Fifth column 710 includes a modified standard deviation ratio corresponding to each of the nodes, e.g., distribution nodes. In some embodiments, the modified standard deviation ratio for a distribution node is a sum of the modified standard deviations generated for each of the devices corresponding to the distribution node divided by a number which is equal to or based on the number of devices corresponding to the distribution node. The sum may include multiple modified standard deviations corresponding to a single device, e.g., a modified standard deviation for receive for a modem and a modified standard deviation for transmit for the modem.

In one particular embodiment, if a single piece of equipment showed fluctuation over 2 levels, resulting in 2 records of flux with a standard deviation of 4 for one level and 6 for other level, that device would contribute a total of 10 to the overall total for that node.

The modified standard deviation ratio field allows one to determine whether the fluctuation across multiple customer premise devices is consistent or caused by a one-time spike. In this field the higher the number for the modified standard deviation ratio, the more endemic fluctuation corresponding to the node. In various embodiments, some action is taken for distribution nodes with high modified standard deviation ratios, e.g., above a predetermined limit. In various embodiments, different actions are taken for different distribution nodes with modified standard deviation ratios exceeding different predetermined limits. For example, in one embodiment, exceeding a first level results in the generation and storage and/or display of a fluctuation level report, exceeding a second level results in the commanding a change to the regularly scheduled testing, exceeding a third level results in commanding diagnostic testing, and exceeding a fourth level results in automatically dispatching a service technician to the node. In some embodiments, where there are limited resources for troubleshooting and repair, e.g., a limited number of service technicians to perform troubleshooting and repair, the nodes with the higher modified standard deviation ratios get attention before the nodes with the lower modified standard deviation ratios.

Sixth column 712 includes the number of critical violations corresponding to each of the nodes. In some embodiments, the number of critical violations is a raw count of how many times a signal level fluctuated greater than a critical threshold during a data window. In this example the critical threshold is 12 dB. Both changes in FDC and changes in RDC measurements are evaluated in determining the number of critical violations. In some embodiments, there are different critical violation threshold used for RDC and FDC.

Seventh column 714 includes the number of warning violations corresponding to each of the nodes. In this example, a warning violation is a violation above a warning violation threshold of 6 dB and is less than a critical violation. The number of warning violations is raw count of how many times a signal level fluctuated by at least 6 dBs and up to and including but not greater than 12 dBs during a data window. Both changes in FDC and changes in RDC measurements are evaluated in determining the number of warning violations. In some embodiments, there are different warning violation thresholds used for RDC and FDC.

Eighth column 716 includes the percentage of accounts that are fluctuating corresponding to each of the nodes. Ninth column 718 includes a percentage of customer premise devices that are fluctuating corresponding to each of the nodes.

Figure 8:
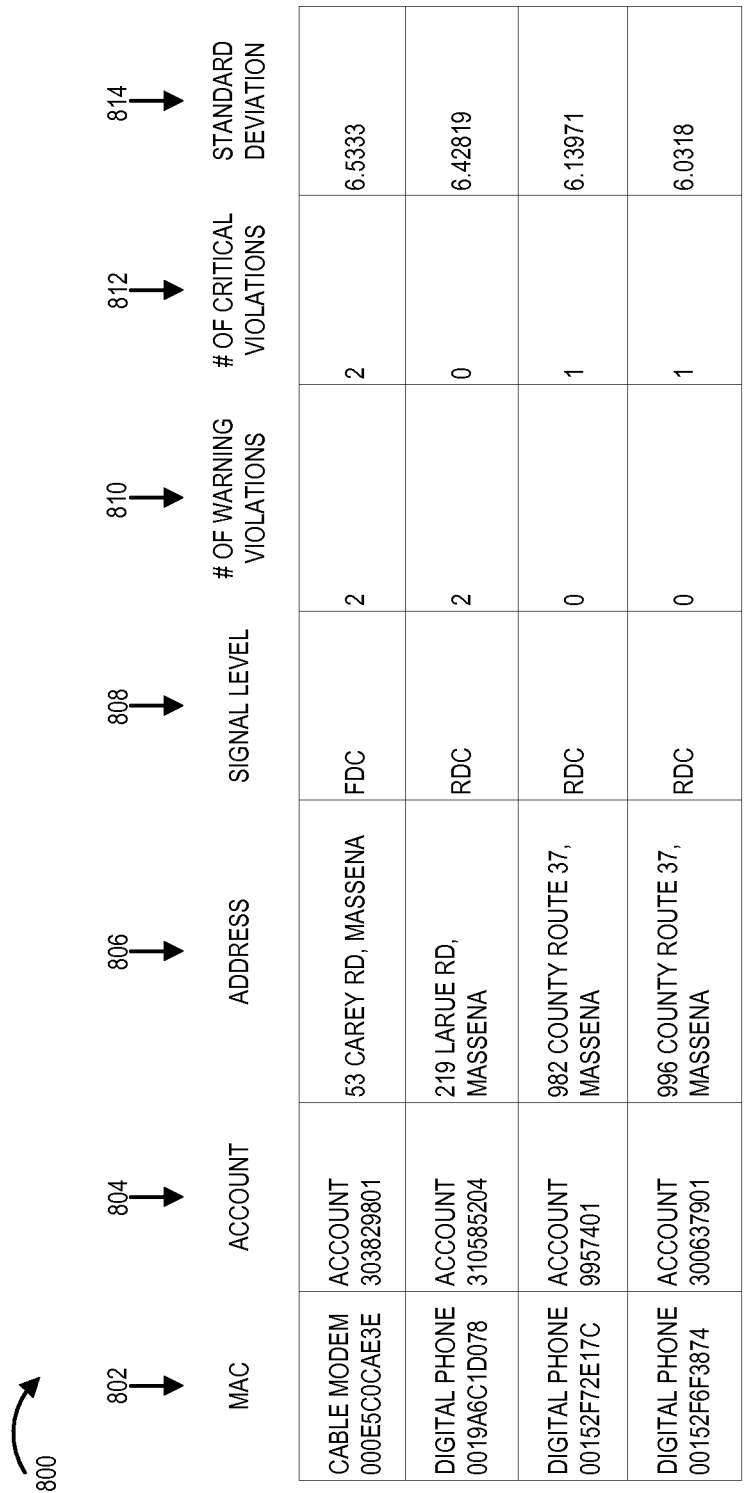
FIG. 8 is a table listing summarized collected and/or processed data corresponding to particular individual customer premise devices.

An example of a given area of subscribers and their devices is provided in drawing 800 of FIG. 8. Drawing 800 of FIG. 8 illustrates an exemplary Node Flux report which provides a view of fluctuating customer premise devices corresponding to a distribution node. First column 802 identifies particular devices and corresponding MAC addresses. Second column 804 includes account information corresponding to each of the devices. Third column 806 includes address information corresponding to each of the devices. Fourth column 808 identifies the signal type for which at least one violation has been detected, e.g., Forward Data Carrier (FDC) or Return Data Carrier (RDC). Fifth column 810 includes a count of the number of warning violations corresponding to each device and corresponding signal type. Sixth column 812 includes the number of critical violations corresponding to each device and signal type. Seventh column 814 includes a standard deviation corresponding to each device and signal type which has been identified as having at least one violation.

Figure 9:
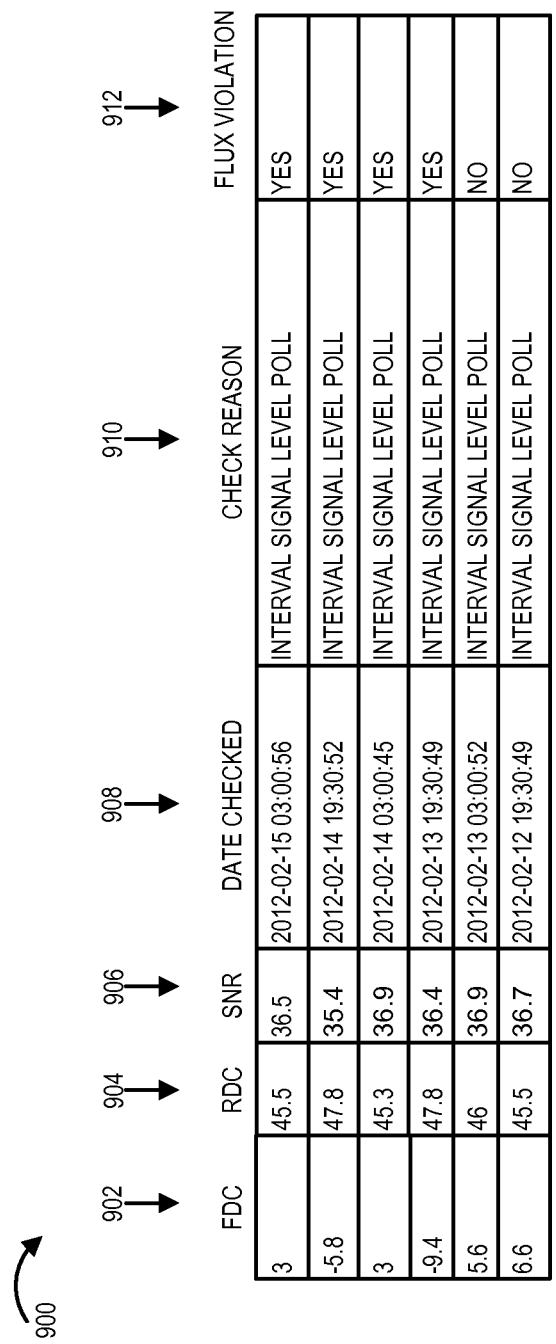
FIG. 9 is a table listing measurements, time tag information corresponding to the measurements, information identifying the reason the measurements were performed, and an indication as to whether or not there were any detected fluctuation violations for a set of measurements for a particular single customer premise device.

An example of an exemplary individual sequence of levels used in generating some of the above described data sets in FIGS. 7 and 8 is provided in drawing 900 of FIG. 9. First column 902 includes Forward Data Carrier (FDC) measurement level values. The forward data carrier level value refers to the receive level of signals at the customer premise device which is receiving signals from a distribution node to which it is connected. The second column 904 includes Return Data Carrier (RDC) measurement level values. The return data carrier level value refers to the transmit level of signals at the customer premise device which is transmitting to a distribution node to which it is connected. Third column 906 includes signal to noise ratio (SNR) measurement values. Fourth column 908 identifies when the measurements were performed. Fifth column 910 identifies the reason that the check was performed, e.g., as part of a scheduled interval signal level poll, or as part of a network diagnostic operation in response to a detected problem. Six column 912 indicates whether or not any fluctuation violations were detected.

Various embodiments are possible beyond those which have already been described and the invention is not limited to the particular examples which have been discussed above.

In the above described methods, in some embodiments, each step may be performed by one or more different software instructions executed by a computer processor, e.g., a central processing unit (CPU). At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine, e.g., computer, executable instructions, such as software, included in a non-transitory machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A method of monitoring a communications system comprising:
operating a monitoring device including a processor and memory to perform the steps of:
collecting at least one of transmission power level information or received power level information from a first plurality of customer premise devices corresponding to a first network area;
collecting at least one of transmission power level information or received power level information from a second plurality of customer premise devices corresponding to a second network area;
generating a first group power level deviation metric from collected power level information received from said first plurality of customer premise devices;
generating a second group power level deviation metric from collected power level information received from said second plurality of customer premise devices;
comparing the first group power level deviation metric to the second group power level deviation metric to determine which one of said first group power level deviation metric and said second group power level deviation metric has a higher value;

taking an action based on at least one of the first and second group power level deviation metrics, said taking an action based on at least one of the first and second group power level deviation metrics includes automatically allocating resources for preventing network outages prior to the occurrence of a fault which may result in a network service outage to the one of the first and second areas based on which one of the first and second group power level metrics is higher.

2. The method of claim 1, wherein at least one of said first or second group power level deviation metrics is based on a ratio.

3. The method of claim 1, wherein taking an action further includes:

generating a fluctuation information report based on the measure of network instability for at least one of the first or second network areas; and performing at least one of:
i) outputting said generated fluctuation information report to an output device; or
ii) storing said generated fluctuation information report on a storage device.

4. The method of claim 1, wherein taking an action further includes:

dispatching a service technician to service equipment used to communicate signals to or from the one of the first and second network areas determined to have the higher group power level deviation metric.

5. The method of claim 1, wherein taking an action further includes:

at least one of: i) changing the rate at which power level information is collected or ii) changing a number of power measurements taken during a portion of a day.

6. The method of claim 1, wherein said first plurality of customer premise devices are connected to a first distribution node, the method further comprising:

determining from the collected power level information a number of customer premise devices connected to the first distribution node having detected transmit or receive power level fluctuations over a first threshold.

7. The method of claim 6, further comprising:

determining from the collected power level information a number of customer premise devices connected to the first distribution node having detected transmit or receive power level fluctuations over a second threshold.

8. The method of claim 7, further comprising:

determining a number of fluctuating customer premise devices connected to the first distribution node, the number of fluctuating devices being a count of the number of devices which had transmit or receive power level fluctuation over said first threshold during a period of time.

9. The method of claim 8, further comprising:

determining a percentage of customer premise devices connected to said first distribution node which are fluctuating devices.

10. The method of claim 8, further comprising:

determining a number of fluctuating accounts corresponding to the first distribution node, the number of fluctuating accounts corresponding to the first distribution node being the number of accounts having customer premise devices connected to the first distribution node with detected fluctuations during said period of time.

11. The method of claim 10, further comprising:

determining a percentage of accounts connected to said first distribution node which are fluctuating accounts.

12. A monitoring apparatus for use in a communications network, the monitoring apparatus comprising:

a memory; and a processor, configured to:

collect at least one of transmission power level information or received power level information from a first plurality of customer premise devices corresponding to a first network area;

collect at least one of transmission power level information or received power level information from a second plurality of customer premise devices corresponding to a second network area;

generate a first group power level deviation metric from collected power level information received from said first plurality of customer premise devices;

generate a second group power level deviation metric from collected power level information received from said second plurality of customer premise devices;

compare the first group power level deviation metric to the second group power level deviation metric to determine which one of said first group power level deviation metric and said second group power level deviation metric has a higher value;

take an action based on at least one of the first and second group power level deviation metrics, and automatically allocate resources, as part of taking an action based on at least one of the first and second group power level deviation metrics, for preventing network outages prior to the occurrence of a fault which may result in a network service outage to the one of the first and second network areas based on which one of the first and second group power level metrics is higher.

13. The monitoring apparatus of claim 12, wherein at least one of said first or second group power level deviation metrics is based on a ratio.

14. The monitoring apparatus of claim 13, wherein the processor is configured, as part of taking an action, to:

generate a fluctuation information report based on the measure of network instability for at least one of the first or second network areas; and perform at least one of:
i) outputting said generated fluctuation information report to an output device; or
ii) storing said generated fluctuation information report on a storage device.

15. The monitoring apparatus of claim 13, wherein the processor is configured, as part of taking an action, to perform at least one of: i) changing the rate at which power level information is collected or ii) changing a number of power measurements taken during a portion of a day.

16. The monitoring apparatus of claim 13, wherein said first plurality of customer premise devices are connected to a first distribution node; and wherein the processor is configured to:

determine from the collected power level information a number of customer premise devices connected to the first distribution node having detected transmit or receive power level fluctuations over a first threshold.

17. The monitoring apparatus of claim 16, wherein the processor is configured to:

determine from the collected power level information a number of customer premise devices connected to the first distribution node having detected transmit or receive power level fluctuations over a second threshold;

generate a fluctuation information report based on said measure of network instability for the first network area; and perform at least one of:

i) outputting said generated fluctuation information report to an output device; or ii) storing said generated fluctuation information report on a storage device.

18. A non-transitory computer readable medium comprising:

computer executable instructions which when executed by a computer cause said computer to control a network monitoring apparatus to:

collect at least one of transmission power level information or received power level information from a first plurality of customer premise devices corresponding to a first network area;

collect at least one of transmission power level information or received power level information from a second plurality of customer premise devices corresponding to a second network area;

generate a first group power level deviation metric from collected power level information received from said first plurality of customer premise devices;

generate a second group power level deviation metric from collected power level information received from said second plurality of customer premise devices;

compare the first group power level deviation metric to the second group power level deviation metric to determine which one of said first group power level deviation metric and said second group power level deviation metric has a higher value; and take an action based on at least one of the first and second group power level deviation metrics, said take an action based on at least one of the first and second group power level deviation metrics includes automatically allocating resources for preventing network outages prior to the occurrence of a fault which may result in a network service outage to the one of the first and second network areas based on which one of the first and second group power level metrics is higher.

* * * * *